United States Patent [19]

Niedospial, Jr. et al.

[11] Patent Number: 4,883,236
[45] Date of Patent: Nov. 28, 1989

[54] FILM CASSETTE

[75] Inventors: John J. Niedospial, Jr., Rochester; Patricia D. Fairman, Spencerport, both of N.Y.

[73] Assignee: Eastman Kodak Company, Rochester, N.Y.

[21] Appl. No.: 320,438

[22] Filed: Mar. 8, 1989

[51] Int. Cl.$^4$ .............................................. G03B 17/26
[52] U.S. Cl. .................................. 242/71.1; 242/71.8; 242/71.9; 354/275
[58] Field of Search ...................... 242/71, 71.1, 71.2, 242/71.8, 71.9; 354/275

[56] References Cited

U.S. PATENT DOCUMENTS

| | | |
|---|---|---|
| 988,341 | 4/1911 | Hill. |
| 2,541,476 | 2/1951 | Mihalyi ................................ 242/71 |
| 3,234,024 | 2/1966 | Leinonen ............................... 96/78 |
| 3,659,799 | 5/1972 | Cerutti et al. ....................... 242/71.9 |
| 3,677,499 | 7/1972 | Wangerin ............................ 242/210 |
| 3,695,160 | 10/1972 | Stockdale ...................... 242/71.1 X |
| 3,797,777 | 3/1974 | Hosono et al. ...................... 242/197 |
| 4,423,943 | 1/1984 | Gold .................................... 354/275 |
| 4,488,796 | 12/1984 | Edwards ............................. 354/275 |

Primary Examiner—Stuart S. Levy
Assistant Examiner—Steven M. DuBois
Attorney, Agent, or Firm—Roger A. Fields

[57] ABSTRACT

A film cassette is disclosed wherein a spool having a convoluted film roll coiled about it, whose outermost convolution is a film leader, includes two coaxial core pieces adapted to telescopically receive one another and respective flanges fixed to the core pieces which radially cover the opposite sides of the film roll. When the spool is initially rotated in a film unwinding direction, rotation responsive means moves at least one of the core pieces axially toward the other one to cause the flanges to clamp the film roll at its opposite sides and a film stripper-guide is received between a leading end of the film leader and the next-inward convolution of the film roll succeeding the leader to remove the leader from the flanges and guide it through a film passageway to the exterior of the cassette shell. The film leader and at least one of the flanges are adapted for mutual engagement to secure the leading end of the leader at least a minimum radial distance from the next-inward convolution sufficient to locate the leading end within range of the stripper-guide to ensure that the leading end will be advanced over the stripper-guide during rotation of the film roll in the film unwinding direction. Biasing means urges one of the core pieces axially toward the other one to urge one of the flanges axially into contact with the film leader to maintain the two mutually engaged.

6 Claims, 5 Drawing Sheets

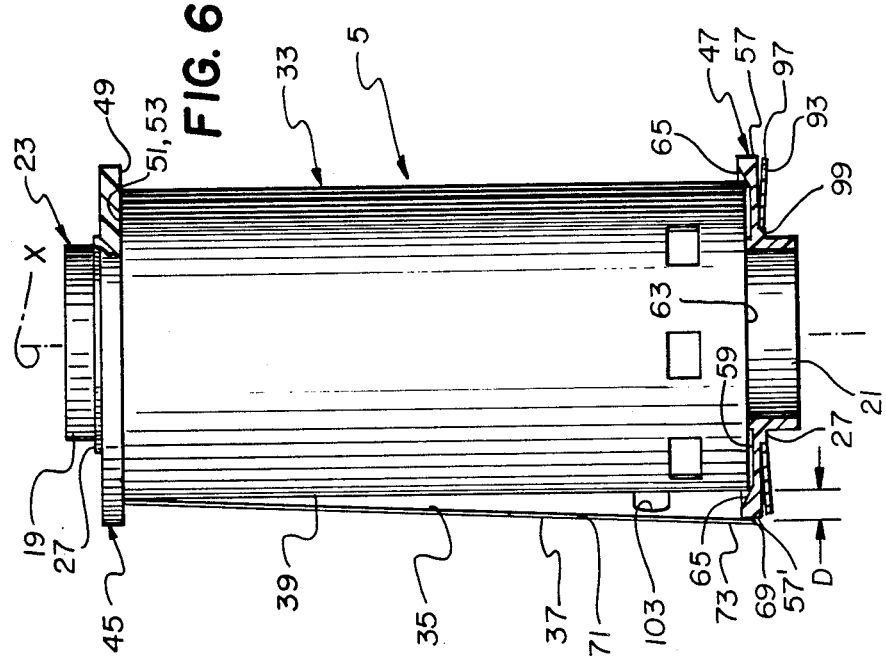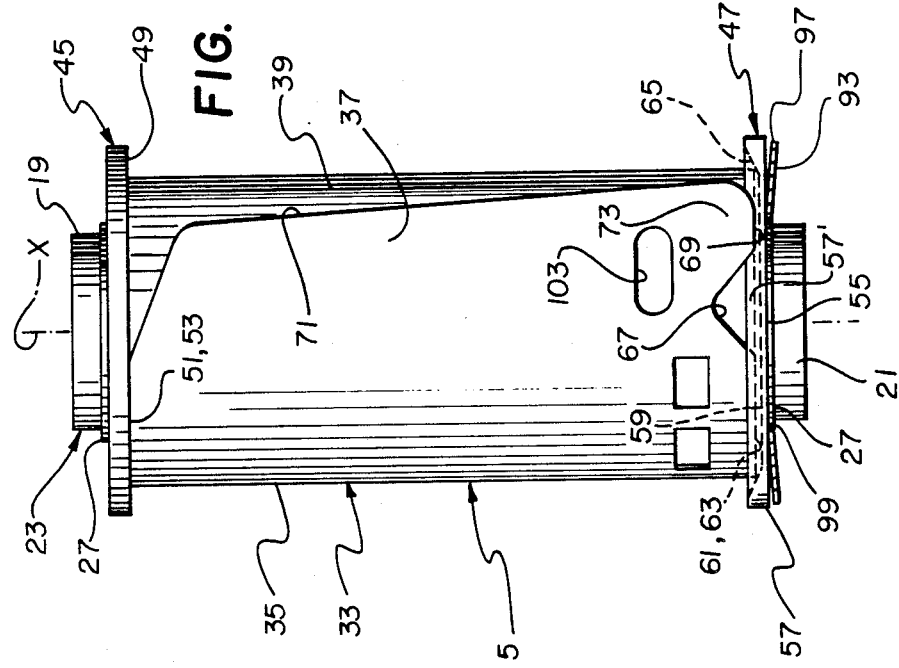

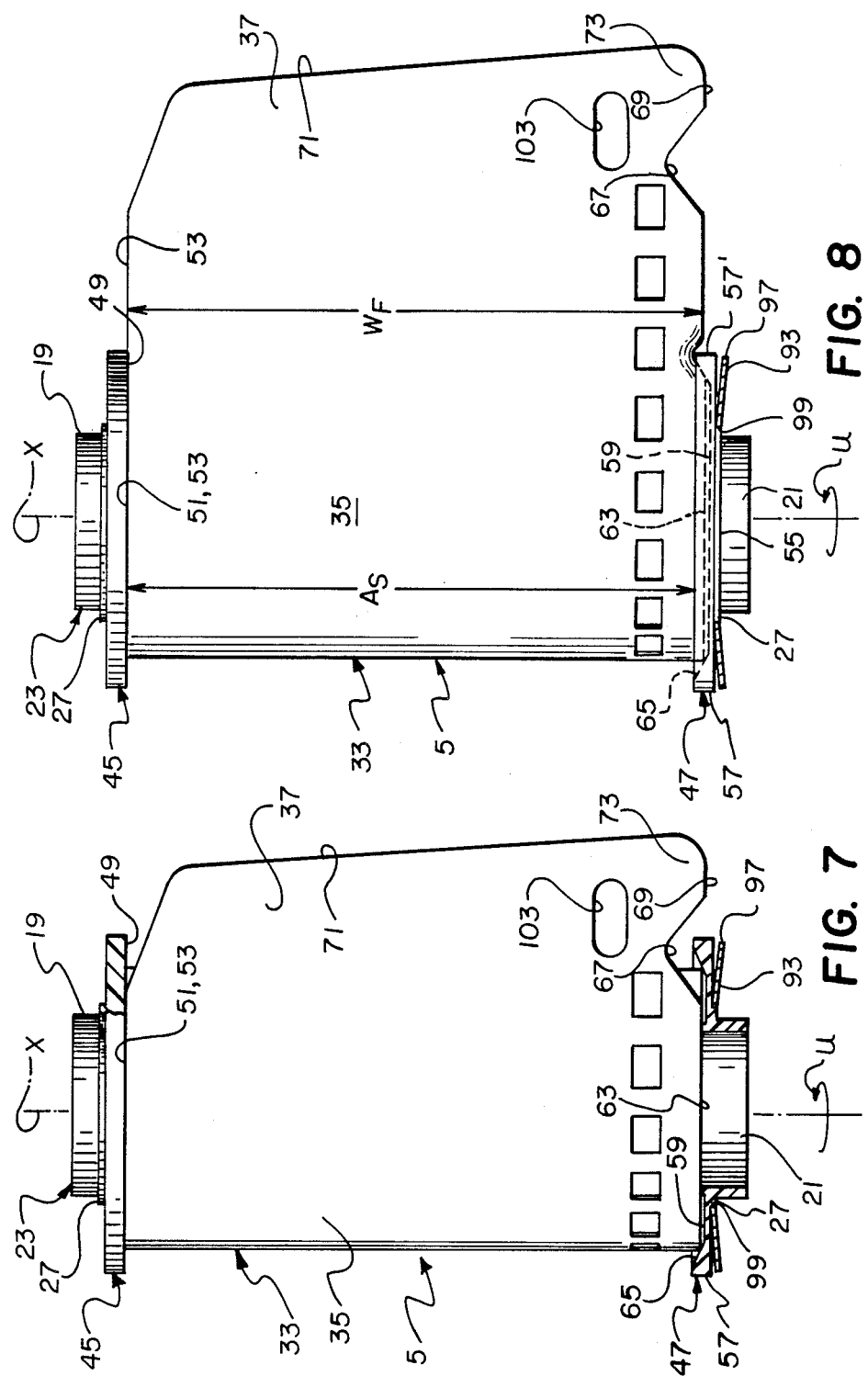

FILM CASSETTE

CROSS-REFERENCE TO RELATED APPLICATIONS

Reference is made to commonly assigned copending applications Ser. No. 185,001, entitled FILM CASSETTE, and filed Apr. 22, 1988 in the name of Patricia D. Fairman, and Ser. No. 071320.440 entitled FILM CASSETTE, and filed Mar. 8, 1989 in the name of John J. Niedospial.

BACKGROUND OF THE INVENTION

1. Field of the Invention

The invention relates generally to the field of photography, and particularly to a film cassette containing roll film.

2. Description of the Prior Art

In conventional 35 mm film manufacturers' cassettes, such as manufactured by Eastman Kodak Company and Fuji Photo Film Co. Ltd., the filmstrip is wound on a flanged spool which is rotatably supported within a cylindrical shell. A leading section of the filmstrip approximately 2⅜ inches long, commonly referred to as a "film leader", protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader section protruding from the slit will remain stationary. The film roll can expand radially until a firm non-slipping relation is established between its outermost convolution and the inner curved wall of the shell. Once this non-slipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35 mm camera to engage the protruding leader section to draw the filmstrip out of the shell.

A 35 mm film cassette has been proposed which, unlike conventional film cassettes, can be operated to automatically advance the filmstrip out of the cassette shell by rotating the film spool in the unwinding direction. The film leader normally does not protrude from the cassette shell. Specifically, in U.S. Pat. No. 4,407,579, granted Oct. 4, 1983, there is disclosed a film cassette wherein the film spool is comprised of two spool pieces constructed to telescopically receive one another. Each spool piece includes a radially extending flange which is adapted to lie closely adjacent to but not in contact with one of the opposite sides of the film roll. A trailing end of the film roll is attached to one of the spool pieces, and a leading end of the roll rests against a cylindrical insert located between the two flanges and the cassette shell. The insert restricts the maximum diameter of the film roll to a value less than the diameter of the flanges, and it includes an integral stripper-guide located immediately ahead of a slot in the insert which leads to the light-trapped film passage opening of the cassette shell. To move the leading end of the film roll over the stripper-guide, into the slot, and through the light-trapped opening, to make it available outside the film cassette, one must manually grasp the opposite ends of the film spool and move the two spool pieces axially toward one another until the flanges are axially positioned in firm clamping relation with the opposite sides of the film roll. While maintaining this inwardly directed manual pressure against the two spool pieces, one then must rotate the film spool relative to the cassette shell in an unwinding direction. As a result, the leading end of the film roll will be rotated relative to the insert, causing it to be advanced over the stripper-guides into the slot, and through the light-trapped opening to the outside of the cassette shell.

To advance the leading end of the film roll to the outside of the cassette shell in U.S. Pat. No. 4,407,579, the stripper-guide must be received between the leading end and the next inward convolution of the film roll. If, however, the leading end has been stored between the stripper-guide and the next-inward convolution of the film roll, particularly for an extended time, rather than being stored in contact with the interior wall of the insert, or because of extremely high temperature and/or humidity conditions, it could develop sufficient inward curl to keep it out of range of the stripper-guide. Consequently, when the film spool is rotated in the unwinding direction, the leading end may not be picked up by the stripper-guide and guided into the slot of the insert, thereby preventing it from exiting the cassette shell.

The Cross-Referenced Applications

Cross-referenced application Ser. No. 185,001 discloses a film cassette wherein the leading end of a film roll coiled about a film spool is located within the cassette shell. The film spool is comprised of two spool pieces constructed to telescopically receive one another. Each spool piece includes a radially extending flange normally disposed adjacent one of the opposite sides of the film roll. When the film spool is initially rotated in a film unwinding direction, a rotation-responsive cam device coupling the two spool pieces automatically moves one spool piece axially toward the other piece to cause the respective flanges to firmly clamp the flim roll at its opposite sides. As a result, the leading end of the film roll will be rotated past a stripper-guide which strips the leading end from between the flanges and guides it through a light-trapped opening in the cassette shell. Thus, rotation of the film spool in the unwinding direction will advance the leading end to the outside of the cassette shell.

The prior art problem described above in connection with U.S. Pat. No. 4,407,579 might similarly arise during use of the film cassette disclosed in cross-referenced application Ser. No. 185,001. That is, the leading end of the film roll could develop sufficient inward curl (for example, because it was stored between the stripper-guide and the next-inward convolution of the film roll) to keep it out of range of the stripper-guide. Hence, when the film spool is rotated in the unwinding direction, the leading end may not be picked up by the stripper-guide and guided through the light-trapped opening to the outside of the cassette shell. Instead, the leading end may be advanced between the stripper-guide and the next-inward convolution.

Cross-referenced application Ser. No. 320,440 discloses a film cassette wherein a film spool is rotatable within the cassette shell, a convoluted film roll whose outermost convolution is a film leader is coiled about the spool, a pair of film constraining flanges are coaxially arranged on the spool to radially confine the film leader to prevent the leader from substantially contacting an interior wall of the cassette shell, and a film stripper-guide is received between a leading end of the film leader and the next-inward convolution of the film roll succeeding the leader to remove the leader from the flanges and guide it through a film passageway to the exterior of the cassette shell responsive to rotation of the spool in a film unwinding direction. According to the invention, the film leader and at least one of the constraining flanges include mutual engagement means for maintaining the leading end of the leader spaced at least a minimum radial distance from the next-inward convolution sufficient to locate the leading end within range of the stripper-guide to ensure that the leading end will be advanced over the stripper-guide responsive to rotation of the spool in the film unwinding direction, whereby the leading end is prevented from being advanced between the stripper-guide and the next-inward convolution.

SUMMARY OF THE INVENTION

According to the invention, there is provided an improved film cassette wherein (a) a spool includes two coaxial core pieces having a convoluted film roll coiled about them, whose outermost convolution is a film leader, and respective flanges fixed to the core pieces which radially extend over the opposite sides of the film roll, (b) at least one of the core pieces is supported for movement axially toward the other one to move at least one of the flanges axially toward the other one to provide an axial clamping force at the opposite sides of the film roll, and (c) a film stripper-guide is received between a leading end of the film leader and the next-inward convolution of the film roll succeeding the leader to remove the leader from the flanges and guide it through a film passageway to the exterior of the cassette shell responsive to rotation of the spool in the film unwinding direction during application of the axial clamping force, and wherein the improvement comprises:

said film leader and at least one of said flanges are adapted for mutual engagement to secure the leading end of the leader at least a minimum radial distance from the next-inward convolution sufficient to locate the leading end within range of the stripper-guide to ensure that the leading end will be advanced over the stripper-guide responsive to rotation of the spool in the film unwinding direction during application of the axial clamping force; and limiting means for restricting axial separation between the flanges, previous to at least one of the flanges being moved axially toward the other one, to maintain the leader and at least one of the flanges mutually engaged to secure the leading end of the leader the minimum radial distance from the next-inward convolution.

In a preferred embodiment of the invention, the limiting means restricts axial separation between the flanges, previous to at least one of the flanges being moved axially toward the other one, to position the flanges continuously in contact with the opposite longitudinal edges of the film leader. Moreover, the limiting means includes biasing means for urging one of the core pieces axially toward the other one to urge one of the flanges into engagement with the film leader to secure the leading end of the leader the minimum radial distance from the next-inward convolution and to position the flanges continuously in contact with respective opposite longitudinal edges of the leader.

BRIEF DESCRIPTION OF THE DRAWINGS

FIGS. 5 and 6 are elevation views of the film roll and the film spool, illustrating the manner in which the film roll is stored on the film spool; and FIGS. 7 and 8 are elevation views similar to FIGS. 5 and 6, illustrating the manner in which the film roll is unwound from the film spool.

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
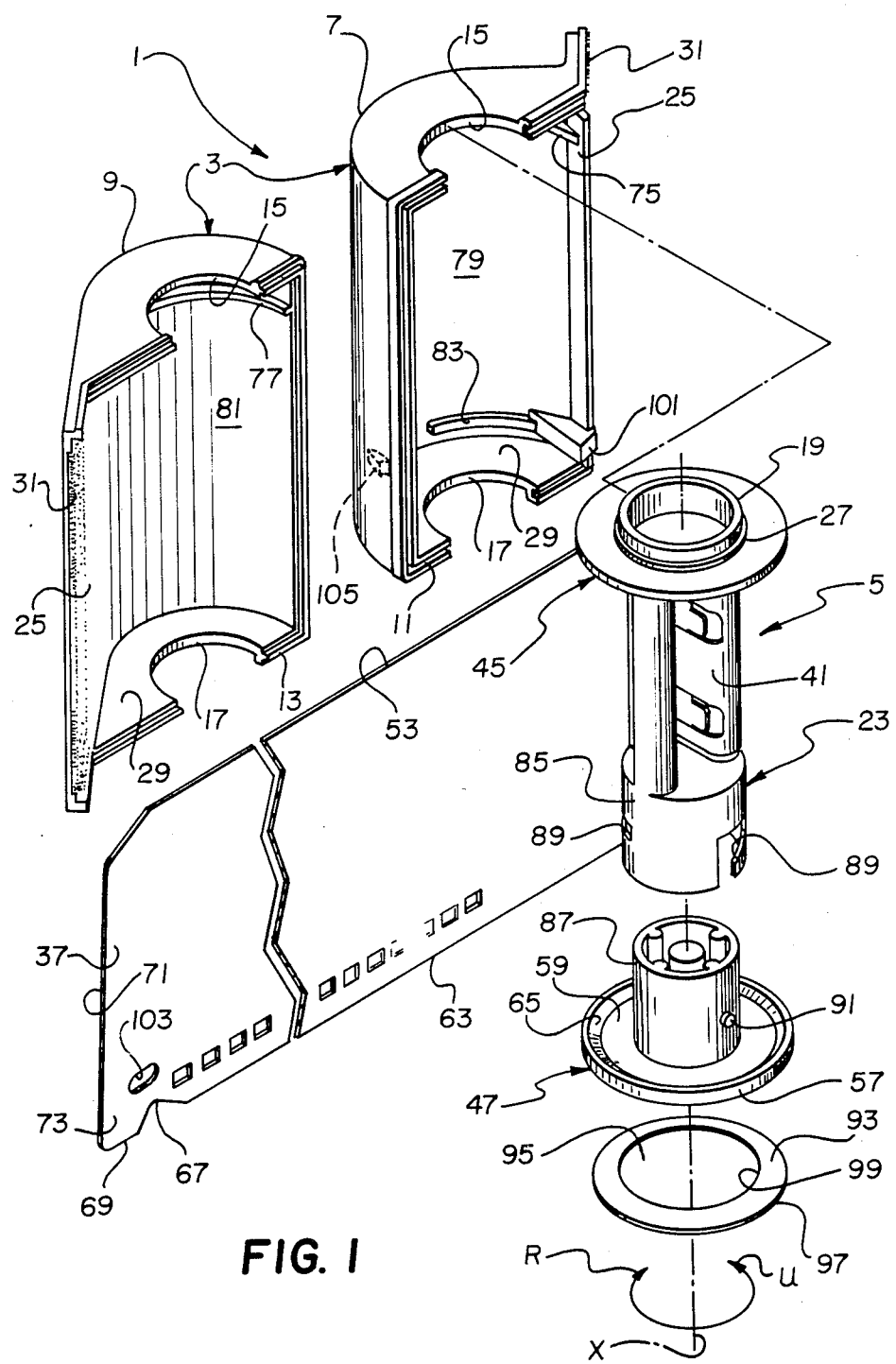
FIG. 1 is an exploded perspective view of an improved film cassette according to a preferred embodiment of the invention.
Figure 2:
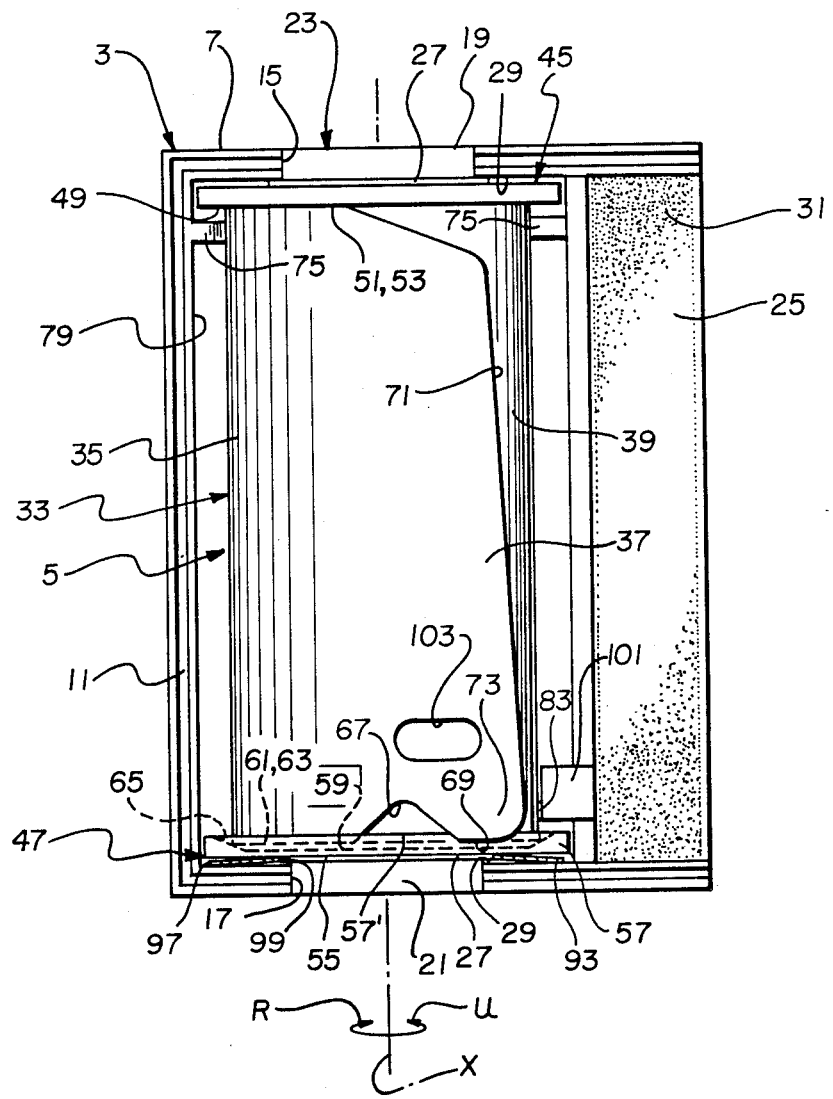
FIG. 2 is an elevation view of the film cassette, illustrating the cassette shell open to reveal a film roll coiled about a film spool.

Referring now to the drawings, FIGS. 1 and 2 depict an improved 35 mm film cassette 1 comprising a light-tight cassette shell 3 and a film spool 5 which is rotatable about an axis X in film unwinding and rewinding directions U and R within the cassette shell. The cassette shell 3 consists of two shell halves 7 and 9 which are mated along respective grooved and stepped edge portions 11 and 13. The mated halves 7 and 9 define upper and lower aligned circular openings 15 and 17 for upper and lower opposite end extensions 19 and 21 of a spool core or hub 23, and they define a film passageway 25 to the exterior of the cassette shell 3. The upper and lower end extensions 19 and 21 of the spool core 23 include respective integral annular surrounds 27 located adjacent upper and lower inside faces 29 of the cassette shell 3 which encircle the two openings 15 and 17. This is to prevent ambient light from entering the interior of the cassette shell 3 through the openings 15 and 17. A known black velvet or plush material 31 lines the interior of the film passageway 25 to prevent ambient light from entering the film passageway.

Figure 3:
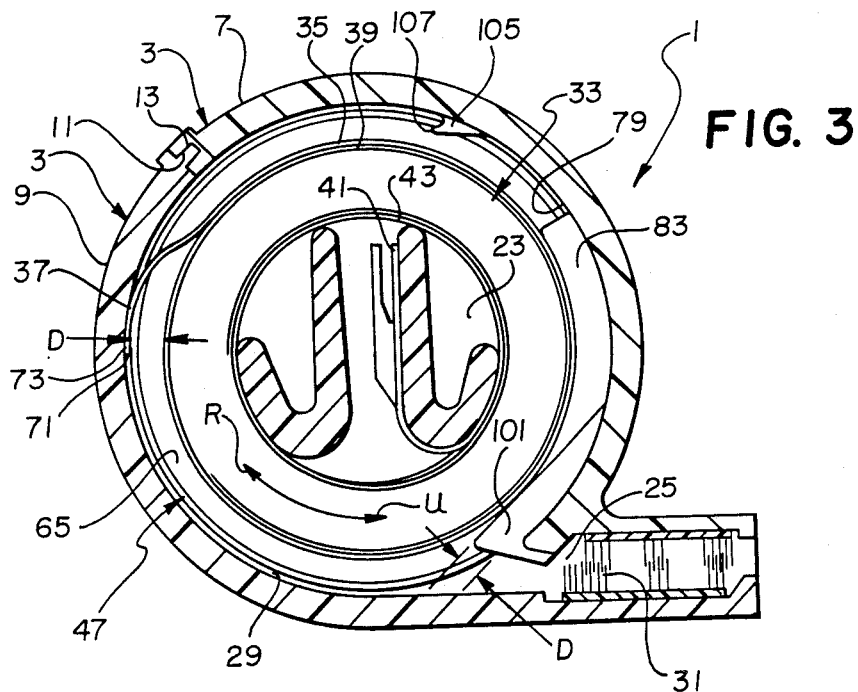
FIGS. 3 and 4 are end views in cross-section of the cassette shell, the film roll, and the film spool.

A roll 33 of 35 mm filmstrip is coiled about the spool core 23 to form successive film convolutions. As shown in FIG. 3, the film roll 33 includes an outermost convolution 35 which is a film leader having a leading or forward end 37, and it includes a next-inward convolution 39 coiled behind the outermost convolution. An inner or trailing end 41 of an innermost convolution 43 of the film roll 33 is secured to the spool core 23.

A pair of upper and lower flanges 45 and 47 radially extend from the spool core 23 as shown in FIGS. 1, 2, 5, and 6. The upper flange 45 is disk-like, and it has a flat inside face 49 that contacts an upper side 51 of the film roll 33 defined by the upper longitudinal edge 53 of each successive convolution of the film roll 33, including the outermost convolution (film leader) 35. The lower flange 47 comprises a disk portion 55 and an annular lip or skirt portion 57 which circumferentially extends from the disk portion. The disk portion 55 has a flat inside face 55 that is slightly spaced from a lower side 61 of the film roll 33 defined by the lower longitudinal edge 63 of each successive convolution of the film roll. The annular lip portion 57 has an inclined or beveled inside face 65 that contacts the lower longitudinal edge 63 of the outermost convolution (film leader) 35 and perhaps the next-inward convolution 39 of the film roll 33, to radially constrain the film roll at the lower longitudinal edge and thereby restrict the maximum diameter of the film roll 33 to a value less than the diameter of the two flanges 45 and 47. A lip-receiving notch 67 is cut in the outermost convolution (film leader) 35 along its lower longitudinal edge 63, relatively close to its leading end 37, to receive a peripheral section 57' of the annular lip portion 57. This allows a relatively short edge-section 69 of the outermost convolution (film leader) 35 connecting the leading end 37 and the notch 67 to overlap the annular lip portion 57 radially outwardly to thus maintain the leading end spaced a radial distance D from the next-inward convolution 39 of the film roll 33. See FIGS. 3, 5, and 6. The leading end 37 has a forward edge 71 inclined from the upper longitudinal edge 53 of the outermost convolution 35 to the lower longitudinal edge 63 of that convolution to form a forward-most tip or tab 73 of the convolution which, like the edge-section 69, overlaps the annular lip portion 57 radially outwardly. See FIG. 5.

The maximum diameter of the film roll 33 is further restricted to a value less than the diameter of the two flanges 45 and 47 by a pair of arcuate ribs 75 and 77 fixed to the two halves 7 and 9 of the cassette shell 3 at their respective inner walls 79 and 81 and by a single arcuate rib 83 fixed to the first-numbered inner wall. The three ribs 75, 77, and 83 protrude radially between the two flanges 45 and 47. See FIGS. 1-3. Preferably, the ribs 75, 77, and 83 are relatively smooth at their respective areas of contact with the outermost convolution 35.

As shown in FIG. 1, the spool core 23 is comprised of two hollow, cylindrical, coaxial pieces 85 and 87. The upper core piece 85 is integrally formed with the upper flange 45 and the lower core piece 87 is integrally formed with the lower flange 47. The upper core piece 85 is constructed to telescopically receive the lower core piece 87 in order to vary the axial distance between the upper and lower flanges 45 and 47. The specific means for varying the axial distance between the two flanges 46 and 47 consists of a pair of inclined, opposite cam edges or ramps 89 located on the upper core piece 85 and respective cam follower pins 91 located on the lower core piece 87. If the lower core piece 87 is initially rotated relative to the upper core piece 85 in the film unwinding direction U, the interaction between the two cam edges 89 and the respective follower pins 91 will cause the lower core piece to be further received within the upper core piece, i.e. the lower core piece will be moved axially toward the upper core piece, thereby slightly reducing the axial distance between the two flanges 45 and 47. The lower core piece 87 can be moved axially toward the upper core piece 89 only until the lower flange 47 is moved into a very firm compressive relation with the lower longitudinal edge 63 of the outermost convolution (film leader) 35. Then, continued rotation of the lower core piece 87 in the unwinding direction (during application of the axial clamping force) will rotate the film roll 5 in the same direction.

A spring-washer 93 as shown in FIGS. 1 and 2 has a central opening 95 through which the lower extension 21 of the spool core 23 axially extends. The spring washer 93 has a circumferential edge 97 in contact with the lower inside face 29 of the cassette shell 3 and an inner edge 99 (defining the central opening 95) in contact with the annular surround 27 of the lower extension. Thus, the spring-washer 93 operates as a compressive spring to normally urge the peripheral section 57' of the annular lip portion 57 of the lower flange 47 into the notch 67 of the outermost convolution (film leader) 35 and to normally urge the inclined edge 65 of that lip portion against the lower longitudinal edge 63 of the outermost convolution.

A film-stripper guide 101 formed with the cassette half 7 is positioned immediately inward of the inner entry to the film passageway 25 to be received between the leading end 37 of the outermost convolution (film leader) 35 and the next-inward convolution 39, to pick up the leading end and guide it into the film passageway responsive to rotation of the film spool 5 in the film unwinding direction U. The leading end 37 will be advanced over the stripper-guide 101 and into the film passageway 25, rather than between the stripper-guide and the next-inward convolution 39, because it is spaced the radial distance D from the latter convolution. Thus, as shown in FIG. 3, the leading end 37 will be located within range of the stripper-guide 101 due to such spacing from the next-inward convolution 39.

When the leading end 37 of the outermost convolution (film leader) 35 is advanced over the stripper-guide 101 responsive to rotation of the film spool 5 in the film unwinding direction U (during application of the axial clamping force), the lower longitudinal edge 63 of that convolution will be slightly flexed by the annular lip portion 57 of the lower flange 47 as shown in FIG. 8, first to allow the notch 67 to separate from the lip section 57' and then to allow successive longitudinal section of the film roll 33 (beginning with the leading end) to exit from between the flanges to the outside of the cassette shell 3. The local flexing of the lower longitudinal edge 63 of the outermost convolution 35 occurs because the film width $W_F$ between that edge and the upper longitudinal edge 63 of the outermost convolution is slightly greater than the axial spacing $A_S$ between the upper flange 45 and the annular lip portion 57 of the lower flange 47.

Figure 4:
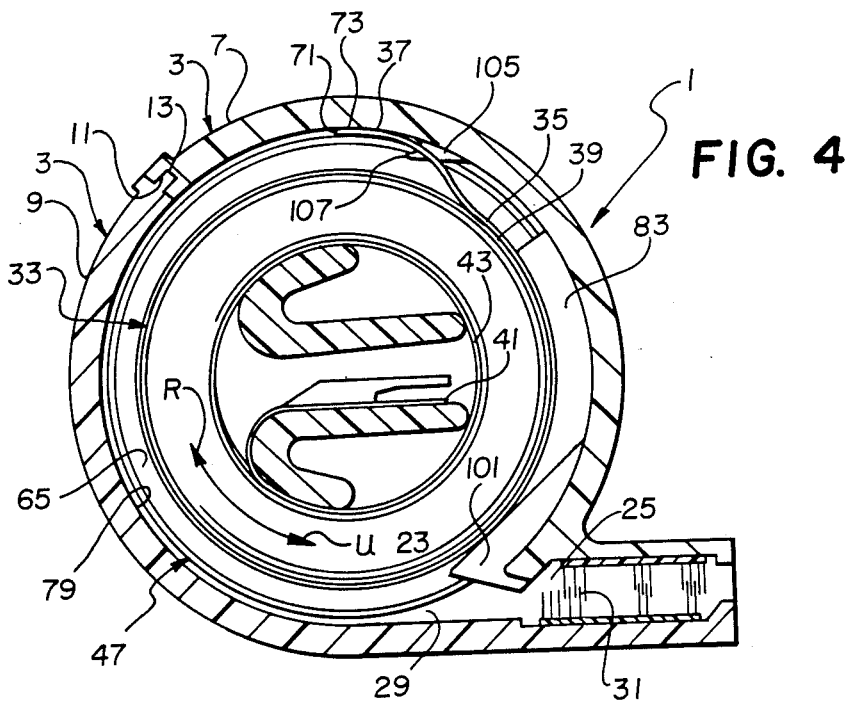

A slot 103 is cut in the outmost convolution (film leader) 35 substantially proximate its leading end 37. A tooth 105 fixed to the interior wall 79 of the cassette shell 3 has a free pointed end 107 which is positioned to be received in the slot 103 to thus engage the outermost convolution (film leader) 35, when the film spool 5 is rotated in the film rewinding direction R as shown in FIG. 4, and to exit the slot to thus disengage that convolution, when the film spool is rotated in the film unwinding direction U as shown in FIG. 3. The engagement of the outermost convolution 35 and the tooth 105 responsive to rotation of the film spool in the rewinding direction R prevents the leading end 37 of that convolution from coming to rest between the stripper-guide 101 and the next-inward convolution 39.

If the film spool 5 is rotated in the rewind direction R before the entire length of the filmstrip has been exposed, and it is desired to subsequently use the remaining available portion of the filmstrip at a later time, the film spool is rotated substantially until the slot 103 receives the free end 107 of the tooth 105 to thus engage the outermost convolution (film leader) 35 to the tooth. Thereafter, to use the remaining available portion of the filmstrip, the film spool 5 is rotated in the unwinding direction U to disengage the outermost convolution (film leader) 35 from the tooth 106 and to re-advance the filmstrip to the outside of the cassette shell 3.

The invention has been described with reference to a preferred embodiment. However, it will be appreciated that variations and modifications can be effected within the ordinary skill in the art without departing from the scope of the invention. For example, instead of using the spring-washer 93 to limit axial separation between the two flanges 45 and 47, the cassette shell 3 can be designed to close tolerances to achieve that purpose.

We claim:

1. An improved film cassette wherein (a) a spool includes two coaxial core pieces having a convoluted film roll coiled about them, whose outermost convolution is a film leader, and respective flanges fixed to said core pieces which radially extend over the opposite sides of said film roll, (b) at least one of said core pieces is supported for movement axially toward the other one to move at least one of said flanges axially toward the other one to provide an axial clamping force at the opposite sides of said film roll, and (c) a film stripper-guide is received between a leading end of said film leader and the next-inward convolution of said film roll succeeding the leader to remove said leader from said flanges and guide it through a film passageway to the exterior of the cassette shell responsive to rotation of said spool in the film unwinding direction during application of said axial clamping force, and wherein the improvement comprises:

said film leader and at least one of said flanges are adapted for mutual engagement to secure said leading end of the leader at least a minimum radial distance from said next-inward convolution sufficient to locate the leading end within range of said stripper-guide to ensure that said leading end will be advanced over the stripper-guide responsive to rotation of said spool in the film unwinding direction during application of said axial clamping force; and limiting means for restricting axial separation between said flanges, previous to at least one of the flanges being moved axially toward the other one, to maintain the leader and at least one of said flanges mutually engaged to secure said leading end of the leader said minimum radial distance from said next-inward convolution.

2. The improvement as recited in claim 1, wherein said limiting means includes biasing means for urging one of said core pieces axially toward the other one to urge one of said flanges into engagement with said film leader to secure said leading end of the leader said minimum radial distance from said next-inward convolution.

3. The improvement as recited in claim 1, wherein said limiting means restricts axial separation between said flanges, previous to at least one of the flanges being moved axially toward the other one, to position said flanges continuously in contact with opposite longitudinal edges of said film leader.

4. The improvement as recited in claim 3, wherein said limiting means includes biasing means for urging one of said core pieces axially toward the other one to urge one of said flanges into engagement with said film leader to secure said leading end of the leader said minimum radial distance from said next-inward convolution and to position the flanges continuously in contact with said longitudinal edges of the leader.

5. The improvement as recited in claim 2 or 4, wherein said film leader includes a notch cut along one of its longitudinal edges, relatively close to its leading end, for receiving a peripheral section of one of said flanges to allow a relatively short edge-section of the leader connecting said leading end and said notch to overlap said peripheral section of the flange radially outwardly to secure the leading end said minimum radial distance from said next-inward convolution, and said biasing means includes an annular compression spring arranged coaxially about one of said core pieces between one of said flanges and said cassette shell for urging said peripheral section of the flange into said notch.

6. The improvement as recited in claim 5, wherein said annular compression spring is a spring-washer having a circumferential edge in contact with said cassette shell and an inner edge in contact with one of said flanges.

* * * * *